June 21, 1938.  L. G. TOWNSEND  2,121,061
METHOD OF AND APPARATUS FOR THE INDEXING
AND PHOTO-TRANSCRIPTION OF RECORDS
Filed July 3, 1936  5 Sheets-Sheet 1

Inventor
LEONARD G. TOWNSEND

June 21, 1938.  L. G. TOWNSEND  2,121,061
METHOD OF AND APPARATUS FOR THE INDEXING
AND PHOTO-TRANSCRIPTION OF RECORDS
Filed July 3, 1936  5 Sheets-Sheet 4

Fig. 9.

Inventor
LEONARD G. TOWNSEND
By
Attorneys

June 21, 1938.                L. G. TOWNSEND                2,121,061
                METHOD OF AND APPARATUS FOR THE INDEXING
                    AND PHOTO-TRANSCRIPTION OF RECORDS
                            Filed July 3, 1936            5 Sheets-Sheet 5

Fig. 10.

Inventor
LEONARD G. TOWNSEND

Patented June 21, 1938

2,121,061

UNITED STATES PATENT OFFICE 2,121,061

METHOD OF AND APPARATUS FOR THE INDEXING AND PHOTO-TRANSCRIPTION OF RECORDS

Leonard G. Townsend, Washington, D. C.

Application July 3, 1936, Serial No. 88,903

35 Claims. (Cl. 40—53)

(Granted under the act of March 3, 1883, as amended April 30, 1928; 370 O. G. 757)

This invention relates to a method of and an apparatus for selecting one or more records from a continuous record bearer containing a series of miscellaneous records.

It is an object of the invention to provide a machine which is capable of supplementing and extending the present state of the art regarding the compilation, maintenance and tabulation of records. More specifically, it is the object of the invention to complete the work started by punched cards as they are presently known to operate. The function of the punched card is to carry and assemble information from the original documents to their final tabulated records; the function of the machine in accordance with the present invention is to provide a means to return speedily to complete copies of these original documents in an automatic manner.

The present invention lends itself well to a recent development in the maintenance of records by the expedient of microphotographically recording documents or records upon a film in order to preserve them, which results in definite advantages over the conventional filing systems of such records.

Modern business is confronted with three major problems relating to its records, namely:

(1) Filing capacity,
(2) Ease and speed of reference to records, and
(3) The necessity of a large clerical staff for the miscellaneous handling and filing of these records.

With respect to the first objection modern business methods require the apportionment of large amounts of space for the purpose of filing records, entailing also the cost of expensive file cabinets. The second objection against the modern system of maintaining records is the difficulty of access to records stored in the presently known manner. The third objection and probably the most salient one arises not only from the expense entailed by the large clerical staff which is required in the handling of records but also in the losses in time, in money and even in the loss of the actual records themselves as a result of the human intervention involved in the handling of these records.

It is the object of the present invention to overcome all of the objections noted above.

The first objection is eliminated by the fact that in the present state of the art of microphotography upon films it is a simple matter to impose 16,000 records upon 1,000 feet of fireproof film which takes up only a slight space, approximately $\frac{1}{10}$th of one cubic foot. Access to the records is had quickly for the reason that true facsimile photographic copies of the original records in either the original, reduced, or enlarged size may be obtained in an average time of five seconds per record. Furthermore, since the machine in accordance with the invention may be adjusted for completely automatic operation and may be controlled by pre-sorted punched cards, the human error is eliminated entirely.

In the realization of my invention, original records may be photographed to a reduced scale upon a record bearer which may take any form known in the art. The record bearer may be made of a paper or fabric film, a metal band or wire or any other material capable of carrying the desired record. The mode of recording may involve any step known in the art for evidencing the record such as by printing, writing, etching, punching, magnetizing or photographing. In the preferred form of the invention the records are photographed by means of a camera upon a transluscent or transparent film commonly used in the art of photography and which may be suitably processed in order to render it fireproof, for the purpose of preserving the records under all common hazards.

Thus the original records or documents may be photographed to a reduced scale upon a strip of 35 mm. film carried on a 1,000 foot reel. With the present practice which is standard for this size of film, sixteen frames containing sixteen records are imposed upon each foot of film, rendering possible the recording of 16,000 records on a 1,000 foot reel. If a 16 mm. film is used, a correspondingly greater number of records may be imposed upon a unit length of the film strip. Upon the completion of the film and its final processing to bring out the photographed records thereupon, the successive records on the film are projected in a size which may be read easily upon a viewing plate for the purpose of preparing punched cards for the individual records containing all the desired statistical information thereon. At the same time, each punched card is given a serial number, which may be effected automatically, which corresponds with the numerical sequence of the particular record under consideration in the length of film strip. With the serial number information upon the punched card it is now possible to select the particular record corresponding to this card at any time in the future that this record is desired. Thus, the several cards may be sorted into different classifications, and when placed in the machine according to the present invention, they will select the corresponding document or record for the purpose of producing a visual indication or a permanent recording thereof.

Furthermore, in conjunction with the preparation of punch cards from the successive records on the film it is possible to prepare summary cards from the pre-selection of desired records as controlled by the punch cards.

Although the present invention contemplates a machine which is automatic in its operation in every detail, it is possible to make a selection of a desired record manually with the knowledge of the serial number or numerical sequence of such record with respect to the other records on the film strip.

The present invention contemplates the production of a permanent film record of certain documents selected by sorting the statistical information on the punched cards, and such documents may be printed upon a "summary film strip" cooperating with the record film strip. In this case the selection of the desired record is accomplished in the same manner as when a record is selected merely for the purpose of obtaining a visual indication thereof. Thus, when a tabulation is required involving several selectable factors such as that of a number of persons within a certain age group, within a given territory, or any other variable factors, the machine automatically selects only those documentary records fulfilling the requirements dictated by the punch cards and transfers them to another strip of film which may be filed for further quick reference.

If instead of the summary strip, paper prints of the original documents are desired, either of reduced or larger size, or of the same size, as the documents, the machine may be designed to deliver these in an entirely automatic manner. Finger prints, photographs and all reading matter are capable of being faithfully reproduced without necessitating reference to the original documents after they have once been photographed on the film upon which the machine, in accordance with the present invention, operates. These several functions may be accomplished automatically by the machine in any sequence or order desired.

It is the object of the invention to provide a machine which accomplishes the selection of a desired portion of a continuous record bearer and for stopping this selected portion at a registering station in order to effect a visual indication or a permanent recording of this selected portion in response to a manual setting of a circuit which corresponds to the numerical sequence of the desired record with respect to the other records on the film strip, or to automatically, by a sensing means actuated through holes in a punched card in accordance with the above mentioned numerical sequence, bring about a similar result.

It is a further object of the invention to provide a setting mechanism which is manually operated by a series of keys and which is designed to cooperate selectively with an automatically operating mechanical sensing mechanism controlled by a punched card, in each of which cases the keys control the conditioning of an electrical circuit for the purpose of obtaining a desired result in machines of this type generally, and the stopping of the film at a desired point in its lineal travel of this machine, specifically.

It is a further object of my invention to provide a machine which is compact in arrangement, economical to manufacture, and certain in its operation in the execution of its functions for which it is designed.

It is a further object of my invention to render possible successive operations with my machine irrespective of the close proximity between successive records which are to be aligned with the registering station. This is rendered possible by feeding the film forwardly beyond the desired record for a predetermined extent and returning the film in a reverse direction for a like extent.

It is a further object of my invention to simplify the resetting of the machine for repeated use and for rewinding the film for later reference.

Other objects and purposes will appear from the more detailed description of the invention following hereinafter taken in conjunction with the accompanying drawings wherein.

Figure 1:
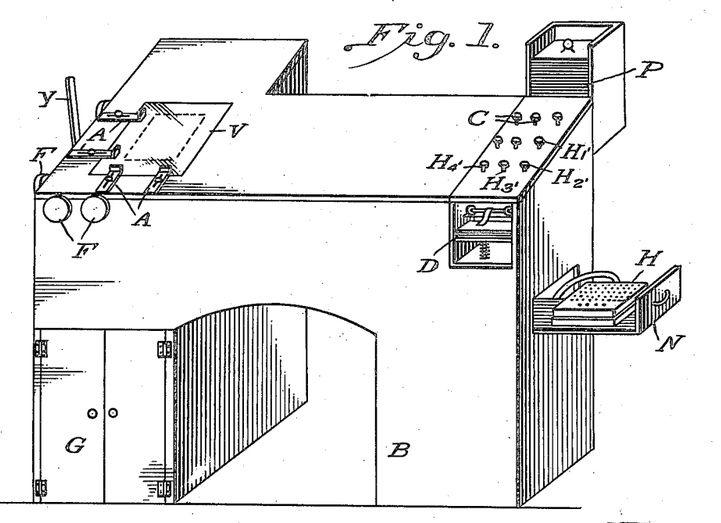
Figure 1 is a perspective view of one preferred embodiment of my machine showing the general arrangement of the parts.

In Figure 1 is shown a casing B which may assume any desired configuration, preferably in conformity with the placement of the several elements which are combined in the assembly of this machine. Gates G are provided on the left side of the machine for loading it with the desired elements upon which it operates such as the several film reels which are charged into the machine corresponding to its different functions. An opening in the machine is provided at the top thereof and its extent is controlled by adjusting screws F operating upon adjustable slides (not shown). A glass plate V is superposed over this opening and takes the form of either a ground glass plate or a transparent plate depending upon the nature of its functioning, that is whether it operates as a viewing plate or a platen of a camera. Adjustable guides A, position accurately any documents, records, or any other objects which are placed upon the glass plate V.

Thus, the machine is designed to prepare a film strip from the original records for subsequent operation thereupon by the machine. In this case these records are placed upon the transparent glass V and are individually photographed by a camera mechanism incorporated into the machine to obtain a permanent record of these documents. With the use of a 1,000 foot 35 mm. film, 16,000 records may be imposed upon the film in the camera and after suitable development constitutes the record bearer upon which the machine is designed to operate at a later date for the purpose of selecting any one or more records therefrom.

Subsequently the ground glass plate V is put in place and the film strip may be run through the machine for successive projection of the copies of the document records, from which punched cards bearing the required information may be prepared. In addition, these cards may be punched automatically with identifying openings corresponding to the position or the order of the appurtenant record in the film strip, as evidenced by the extent of travel of the film feed sprocket. It is this relationship which is relied upon to control the stopping of the film at preselected portions thereof.

When reference is desired to any record on a film strip, the magazine containing it and a take-up reel are charged into the machine through the gates G. The film is fed from the magazine to the take-up reel until the desired record is reached when the feed is stopped in the manner described in detail hereinafter, and a visual indication or a permanent recording of the desired record is effected. In this instance, the glass plate V is formed of ground glass and constitutes a viewing plate if merely a reading of the record is desired. On the other hand if a permanent recording of a document record is wanted, the machine may be charged additionally with a positive firm reel in order to make a contact print of the desired record, or if enlarged paper prints of the records are desired, a lever Y is provided upon the machine to suitably control a light reflecting system for the projection of the record onto a proper surface to obtain this type of print. The mechanism for producing such enlarged prints may be disposed in the rear portion of the machine to the rear of the viewing plate V.

Upon the right side of the machine is provided a punched card operating mechanism which may be of any type known in the art or a combination of the several types known in the art. This portion of the machine may be controlled by suitable control keys C provided upon the machine which may control the motor for feeding the selected punched cards into the field of operation of the sensing mechanism, the initiation of the sensing movement, the ejection of the punched cards at the conclusion of the operations, and other operations common to this type of mechanism.

The series of cars P represent a group of such cards which have been selected by passing a group of cards through a sorting mechanism or analogous machine for the purpose of selecting those satisfying a particular statistical or accounting problem for which corresponding records are to be obtained from the film strip. Each of these cards is provided with identifying openings corresponding to a serial number of the record on the film strip and to its position with respect to the remaining records on the film, as explained above. The punched holes in the card may control the stopping of the film at the desired point of its lineal travel, and after the predetermined time required for the visual indication or the permanent recording of the desired record, the movement of the film is again executed by the feeding of the next successive card to bring successively the desired portions of the film into operation for further reference purposes. The several cards as they are ejected from the machine are accumulated at D.

The machine may be operated without resorting to an automatically controlled sensing mechanism operating from punched cards. The serial number of a card may be read and manually set on a setting mechanism H having keys thereupon, which mechanism is fitted upon a drawer N adapted to be withdrawn from the machine, in the position shown in Fig. 1, to effect a manual selection of the desired portion of the film for stopping. When this drawer N is inserted into the machine, the keys thereupon are adapted to cooperate with the automatically operating sensing mechanism controlled by the punched cards to actuate the circuit making elements which adjust the electrical circuits of the machine for the desired operation.

The setting mechanism H is provided with four keys $H_1$, $H_2$, $H_3$ and $H_4$ for controlling the functioning of the electrical circuits of the machine in the manner described in detail hereinafter. $H_1$ constitutes a "start" or "reset" key; $H_2$ is a "stop" key; $H_3$ is a "rewind" key, and $H_4$ is a "release" key. These control keys are duplicated at the top of the machine at $H_1'$, $H_2'$, $H_3'$ and $H_4'$ and control the machine in a manner similar to the case described above when the machine is operated exclusively by the punched card mechanism.

Figures 2, 3:
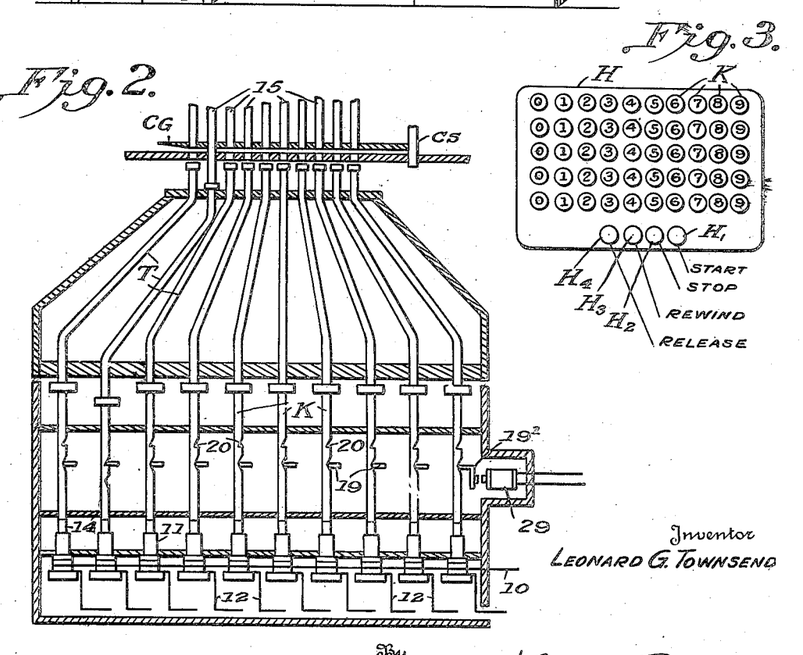
Figure 2 is a vertical sectional view through the machine showing the cooperation between the automatically operating sensing mechanism designed to operate upon punched cards with the mechanical setting means, for the adjustment of the necessary electrical circuits for the conditioning of the machine to stop at the desired point of lineal travel of the film.
Figure 3 is an enlarged plan view of the setting area of the mechanical setting device which may be shifted into the body of the machine as shown in Fig. 2, or positioned outside thereof as shown in Fig. 1 for the purpose of manually setting the machine for its functions.

In Fig. 2 is shown CG constituting a card guide for a punched card which is fed thereinto by a suitable mechanism, forming no part of the present invention, and the movement of which is stopped at a predetermined point of its travel by a card stop CS. Thereupon the sensing mechanism 15 of the punched card unit comes into play and depresses the translator wires T which are alined with any openings in the punched card. These translator wires are spread in the casing in order to take care of the difference in spacing of the sensing fingers 15 from that of the keys K forming part of the manually operated setting mechanism. Thus, the downward movement of any one of the sensing pins 15 effects a corresponding downward movement of its alined translator wire T which in turn depresses its corresponding key as shown in the case of the second key from the left in Fig. 2.

As may be seen from Fig. 3 there are five rows of keys similar to that shown in Fig. 2 giving rise to a capacity of 99,999 different combinations of serial numbers, which may be extended if desired, but which is adequate for the present purpose for the reason that a single reel of film according to the present state of the art, contains a lesser number of records than this limit.

The actuated keys are latched in their depressed positions by means of latching bars 19 cooperating with notches 20 and remain in their depressed positions until a resetting impulse imposed upon a common bar 19' by means of magnet 29 effects their retraction from the notches 20 to permit the release of the keys.

Figures 5, 6, 7, 8, 8A:
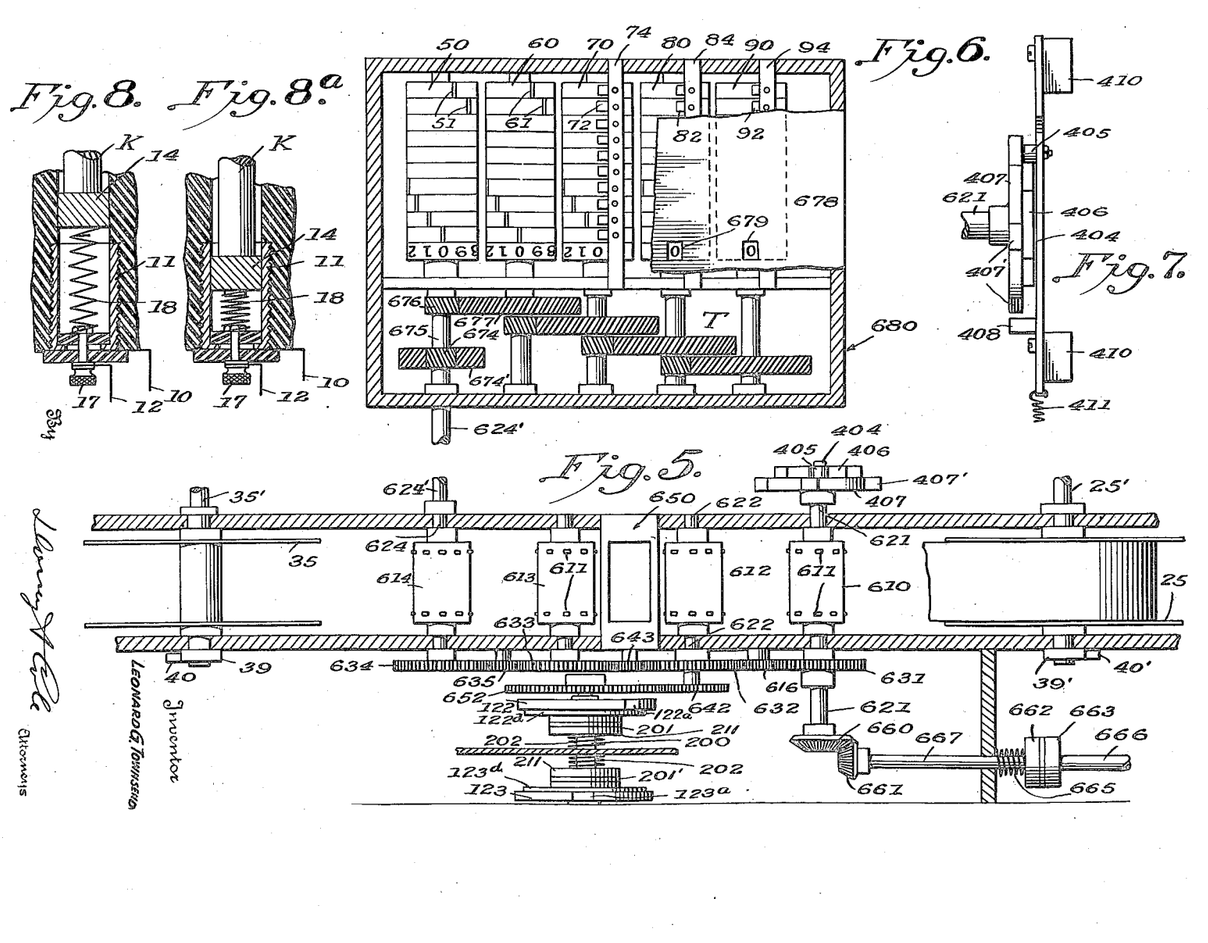
Figure 5 is a horizontal longitudinal sectional view of the machine showing several details of the driving arrangement and stop mechanism for the film.
Figure 6 is an enlarged horizontal sectional view, with certain parts shown in plan, of the counting mechanism connected with a portion of the film feeding mechanism shown in Fig. 5.
Figure 7 is a detailed view of the cam plate film stopping assembly associated with the shaft 62f (Fig. 5).
Figure 8 is an enlarged vertical longitudinal sectional view of the circuit making device at the foot of the setting keys shown in Fig. 2, this figure indicating the position of the parts when the key is in a raised position.
Figure 8a is a view corresponding to Fig. 8 showing the positioning of the parts in the depressed position of one of the keys corresponding to the second from the left shown in Fig. 2.

In Figures 8 and 8a is illustrated the disposition of the parts which serve to condition an electrical circuit for future operation controlled by the keys K. In these figures, the base of the key K is shown formed of a metallic tip 14 which is normally maintained in its raised position by means of a spring 18 operating therebetween and an insulated washer 16 at the base of the key guide. A metallic sleeve 11, set within an insulated frame, is disposed at the lower limit of travel of the key guide having a conductor 10 connected therewith. A contact screw 17 is connected with a conductor 12 which cooperates with a screw bolt to maintain the assembly of the parts and completes the circuit from the tip 14 through the spring 18 to the terminal plug 17 and conductor 12. Thus the circuit at the foot of each key K between the conductors 10 and 12 is normally open but is adapted to be closed upon the depression of any of the keys and the bridging of the circuit between the tip 14 and the sleeve 11.

With the arrangement of the parts as described above, either the insertion of a card into the punched card mechanism or the manual setting of the setting mechanism H in accordance with a serial number as evidenced upon a card, effects the closing of one contact in each one of the horizontal rows shown in Fig. 3. In the case of the manual setting of the machine when a setting of the serial number involving less than five digits, depression of the zeros beyond the last digit must be made. Thus, for example in the case of a card having a serial number 742 the contacts at the base of the setting mechanism, shown in Figs. 2, which are closed will be those corresponding to 00742.

Figure 9:
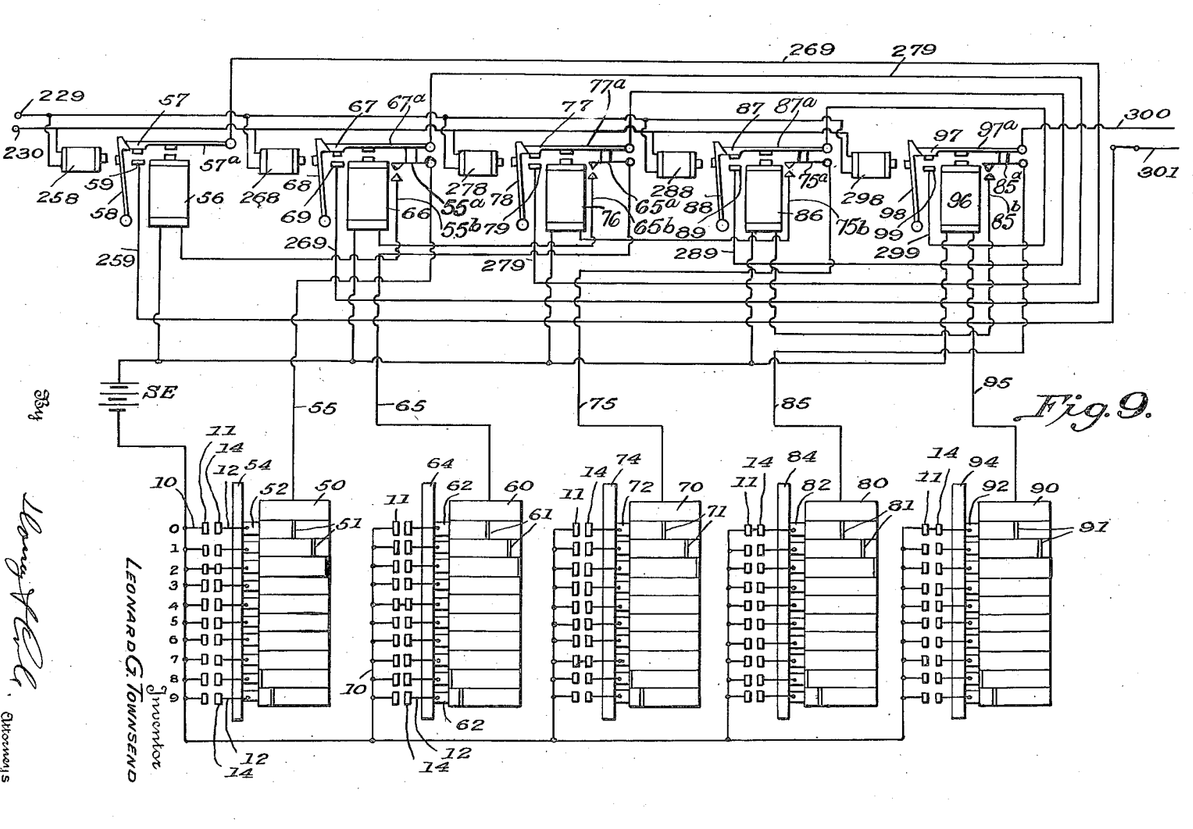
Figure 9 is a circuit diagram developing the cooperation between the setting mechanism shown in Fig. 2, the counting drums of the counting device shown in Fig. 6 and the analyzer magnets serving to control the main circuit.

The above conditioning of the circuit making devices is illustrated in Fig. 9 of the drawings wherein the electrical contact drums of a counting device are indicated at 50, 60, 70, 80 and 90, respectively, denoting the "units", "tens", "hundreds", "thousandths" and "ten-thousandths". The circuit making elements are generally illustrated in this figure at 11 and 12 and are shown bridged at 2 in the "units", at 4 in the "tens", at 7 in the "hundreds" and at zero in the "thousands" and "ten-thousands". The conductor 10 shown connected in common to the several sleeves of the circuit making devices is connected to one terminal of a low voltage direct current source of energy SE which may be a battery or any other low voltage source of potential. Each individual wire 12 appurtenant to the "units" row of keys leading from the contact plug 17 at the base of each key is connected to an individual brush 52 mounted upon a common insulated post 54 adjacent the drum 50. Each brush is designed to cooperate with a conducting segment 51 set into the insulating drum 50. The successive conducting segments 51 are staggered with respect to each other in order to complete a circuit through the brushes at differently timed intervals in the course of rotation of the drum 50. A common lead 55 extends from the drum 50 making contact with all of the conductive segments 51 for the purpose of completing an electrical circuit through an analyzer magnet 56 upon the registry of the conductor segment 51, with brush 52, contacts 14 and 11, common conductor 10 and source of energy SE. With the arrangement described above and assuming that the brushes are normally in alignment with the conductive segment appurtenant to zero it is seen that the above circuit is not completed through the magnet 56 until the counting drum 50 makes $\frac{2}{10}$ of a revolution after contacts 55a and 55b have been closed at an appropriate zero position.

A similar circuit as described above is operative for the "tens" counting drums 60 through the intermediary of conductor 65, contacts 65a and 65b, and analyzer magnet 66. In the case of this drum $\frac{4}{10}$ of a revolution takes place after contacts 65a and 65b are closed before the magnet 66 is rendered operative.

The counting drum 70 is connected through a conductor 75, contacts 75a and 75b with the analyzer magnet 76 in a like manner and the circuit to this magnet is completed upon the execution of $\frac{7}{10}$ of a revolution by this drum after contacts 75a and 75b are closed. The counting drum 80 is connected to analyzer magnet 86 through conductor 85, contacts 85a and 85b and the counting drum 90 is connected directly to analyzer magnet 96 by way of the conductor 95. With the contacting of the top brushes 92 and 82 with the conductive segments 91 and 81, respectively, upon the making of the conductive circuits at the foot of the keys upon the conclusion of the setting operation, corresponding to a zero setting, magnet 96 is energized immediately. Thereby armature 97a is attracted to close a conductive circuit from the conductor 300 through armature 97a, contacts 97 and 99 and to complete a point in the circuit of magnet 86 by way of contacts 85a and 85b, whereupon magnet 86 is energized immediately attracting armature 87a and closing contacts 87 and 89 to extend the circuit from conductor 299, armature 87a, contacts 87 and 89, conductor 289 to armature 77a. A point in the circuit between conductors 300 and 301 remains open at the contacts 77 and 79 until the magnet 76 is energized to close the circuit at this point. With the attraction of armature 87a, contacts 75a and 75b are closed to prepare a point in the circuit of magnet 76. The armatures 87a and 97a, as well as the remaining armatures 57a, 67a and 77a appurtenant to the several analyzing magnets are provided with latching arms 88, 98, 58, 68 and 78 respectively, and once these armatures are attracted, the contacts closed thereby remain closed despite continued travel of the respective counting drums which may in the course of their travel interrupt the circuit through these magnets. The armatures 67a, 77a, 87a and 97a have associated therewith a nonconductive member which bears upon switch contacts 55a, 65a, 75a and 85a, respectively. The latching arms may be held for engagement by leaf springs (not shown) the force of which may be overcome by the attractive force exerted by resetting magnets 258, 268, 278, 288 and 298.

Figure 10:
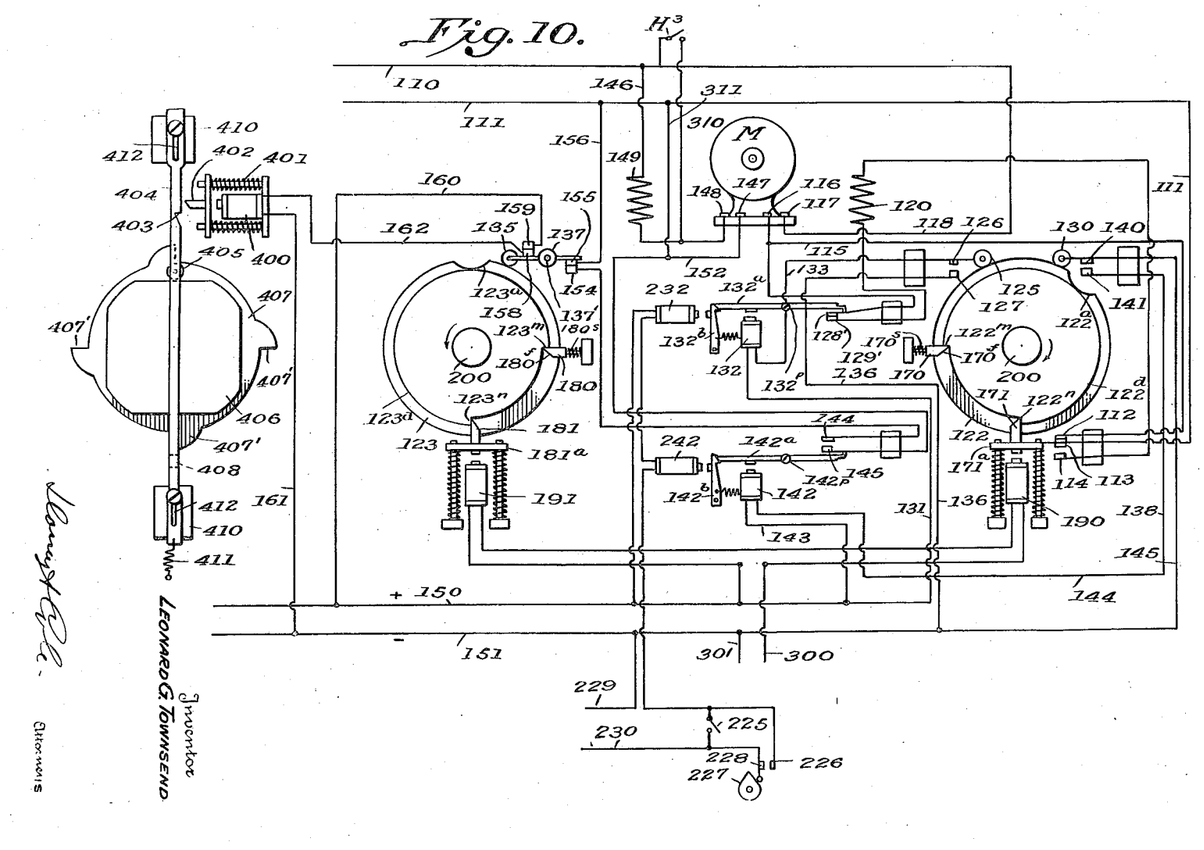
Figure 10 is a circuit diagram of the machine having associated therewith control members forming part of the driving mechanism to effect the stopping of the film at the desired point.

In the assumed operation of the selection of a numerical sequence of 00742, magnet 56 is energized upon the alignment of the brush 52 with its cooperating conductive segment upon the rotation of the drum 50 for $\frac{1}{10}$ of a revolution after contacts 55a and 55b have been closed. Thereby contacts 57 and 59 are closed and remain closed by the latching action of the elements 58. Thereupon the closing of the circuit between the conductors 300 and 301 is advanced from conductor 301 to conductor 259, contacts 59 and 57 and conductor 269. As the magnets 96, 86, 76, 66 and 56 are successively energized to attract their respective armatures, the circuit between the conductors 300 and 301 is completed step by step through the connections developed above. The combination of this circuit completes an energizing circuit for the main cam releasing magnets 190, 191, as shown in Figure 10, the functioning of which is described in detail hereinafter.

The physical arrangement of the counting mechanism described above in conjunction with the electrical circuits completed thereby is shown in detail in Fig. 6 and its mode of coupling with the machine is indicated in conjunction with Fig. 5.

In Fig. 5 is shown the frame of the machine adapted to have mounted upon one side thereof the magazine reel 25 designed to be driven by shaft 25'. Upon the opposite end is provided the take-up reel 35 actuated by the conventional take-up drive mechanism connected to the shaft 25' thereof. A brake shoe 40 (Fig. 4), cooperates with a brake drum 39 on the take-up reel 35 and similar elements 40' and 39' cooperate with the magazine reel, for purposes well recognized in the film winding and reeling art. The film on the magazine 25 is fed by means of a suitable number of sprocket drums such as 610, 612, 613 and 614 disposed between the two reels provided with sprocket teeth 611, in order to insure a positive advance of the film. A registering station for the film is provided at a suitable point between the magazine and take-up reels and may assume the form of a platen 650 having an opening therein for the projection of a light ray R emanating from a light source S (Fig. 4), upon or through the desired record on the film strip.

In the specific embodiment of the machine illustrated herein, the driving mechanism for the feeding of the film is illustrated as comprising a drive shaft 666 which may be connected directly or through the intermediary of the gearing with a suitable electric motor M. Motion from the shaft 666 is transmitted to shaft 667 through the intermediary of a friction clutch 662 and 663, the frictional contact of which may be adjusted by means of a spring 665 to a point which is sufficiently strong to positively drive the film in its normal course of operation and to permit a disengagement of the drive therefrom upon an unusual jamming of the parts. A bevel gear 661 on shaft 667 meshing with a bevel gear 660 on shaft 621 imparts to the latter a driving motion which advances the sprocket feed roll 610 with the film thereupon while the apertures of the latter engage the sprocket teeth 611. Any auxiliary devices known in the art for maintaining the film in contact with the roll may be availed of. Shaft 621 has applied thereto the positive stopping mechanism described in detail hereinafter for arresting the film travel when the desired frame on the film strip arrives at the registering station 650.

The gear wheel 631 is mounted upon shaft 621 and serves to transmit its motion through a series of interengaging gears and pinions 616, 632, 643, 633, 635 and 634 to the remaining feed rolls 612, 613 and 614.

Upon shaft 622 of feed roll 612 may be mounted a pinion 642 for driving the cam control device described in detail hereinafter.

On the extension 624' of the shaft 624 of feed roll 614 is connected the counting mechanism 680 which is formed by a casing having a cover 678 thereupon and in which are provided openings 679 for permitting the viewing of the counting mechanism. In this mechanism is shown the several counting drums 50, 60, 70, 80 and 90 each of which may be composed of ten disks having embedded therein the conductive segments which complete the circuits through the analyzer magnets described above through the brushes mounted upon the several posts, some of which are shown at 74, 84 and 94 in Fig. 6.

The counting mechanism shown in this figure must be viewed from the opposite side in order to read the count thereon and a space is provided upon each of the drums for applying the numerical values corresponding to the several positions of the drum.

In the illustrated embodiment of the invention a transmission mechanism for feeding the film and for actuating the counting mechanism bears the following relationship. Each revolution of shaft 621 corresponds to the feed movement of four picture or record frames on the film. This relationship is maintained by the system of gearing between the several film feed rolls described in detail above. Thus, shaft 624 executes 2½ revolutions during the passage of ten frames of the film thereover. In the coupling of this shaft to the counting mechanism 680, 2½ revolutions of shaft 624' is transposed into one revolution of shaft 675 driving the units drum of the counting mechanism by means of a pinion and gear assembly 674', 674 having a 1 to 4 ratio. A pinion 676 is mounted upon shaft 675 which meshes with a gear 677 on the shaft of the "tens" drum 60 bearing a 1 to 10 relationship which causes the drum 60 to make $\frac{1}{10}$ of a revolution for every complete revolution made by the drum 50. A like pinion and gear connection is made between the tens and hundreds, hundreds and thousands, and thousands and ten-thousands shaft through the transmission system indicated generally by T to actuate the counting mechanism in accordance with the lineal travel of the film. This mechanism embodies no "tens transfer" arrangement of the type generally associated with counting mechanisms and is operable in both directions of rotation. Therefore, this counting mechanism is adapted to be turned back to its zero position in the reverse movement of the drive which takes place at the rewinding of the film from the take-up reel.

Although the counting mechanism as described above is illustrated in the present embodiment of the machine, resort may be had to any other types of counting devices known in the art which may be actuated by the drive mechanism or the feeding movement of the film and the setting of which is responsive to the lineal travel of the film strip. Any type of counter may be utilized in the machine disclosed herein which is capable of completing an electrical circuit upon the attainment of a count thereupon which is coincident with a pre-selected numerical value. This circuit is made through conductors 300 and 301 having a suitable source of direct current energy interposed therein as explained in conjunction with Fig. 9 and is extended into Figure 10 to energize the cam release magnets 190 and 191, cooperating with the cam assembly shown in plan in Fig. 5.

The source of energy for operating the film feed motor M is derived from a 110 volt line represented by mains 110, 111. In the normal operation of the machine while the film is traveling to its pre-selected position the motor M drives the feed sprockets through the transmission system described above and which also rotates the motor circuit controlling mechanism shown in detail in Figs. 5 and 10. In these figures may be seen the clutch-coupled cam units 122, 123 having dwells or depressions 122a, 123a, respectively, in the peripheries thereof. The cam units 122 and 123 are mounted loosely on shaft 200, and are adapted to be rotated through frictional surfaces 201, 201' attached to plates 211 splined to shaft 200 and pressed against the respective cam units by springs 202. Rollers 125 and 130 ride upon the periphery of cam 122 which control circuit making contacts 126, 127 and 140, 141. These rollers become effective when the dwell 122a arrives adjacent each roller in the course of rotation of the cam.

Upon cam 122 is fixed a locking disk 122d having a sector thereof of lesser radius than the remainder thereof, whereby two abutments, 122m and 122n are formed. Likewise a locking disk 123d is fixed upon cam 123 having a sector cut out thereof to form two abutments 123m and 123n.

Two stops 170 and 171 cooperate with the abutments on the disk 122d. The first stop 170 may be a fixed one and prevents movement of the cam in a counterclockwise direction. This stop is forced into its extended operative position by means of a spring 170s. By virtue of the inclined face 170f, the stop may be retracted against the force of spring 170s by the action against the face of the abutment 122n. The stop 171 is retractable upon operation of the armature of relay 190, and serves to prevent a rotation of the cam 122 in a clockwise direction until it is retracted by the operation of this relay.

The second cam 123 is provided with the dwell 123a, and a single roller 135 rides upon the periphery thereof adapted to open two pairs of contacts upon the dropping of the roller 135 within the dwell. The roller 135 is mounted upon an insulated arm 137 pivoted at 137' and the contacts 158, 159 and 154, 155 are controlled thereby. In the position illustrated in Fig. 10 both of these pairs of contacts are in closed position and are adapted to be opened for purposes explained hereinafter upon dropping of the roller.

As explained above in conjunction with the cam 122, two stop members 180 and 181 are associated with cam 123. The former, although its position may be adjusted, as is also true of stop 170, constitutes a fixed stop member cooperating with abutment 123m on the locking disk 123d, to the rotation of the cam in a counterclockwise direction but blocking the movement of the cam in a clockwise direction. The movable stop 181 cooperates with abutment 123n and forms part of a retractable armature 181a adapted to be operated by the analyzer magnet 191.

In conjunction with the main 110 volt circuit for operating the motor, a low voltage control circuit, which may be 15 volts, direct current, represented by mains 150 and 151, operates to energize the various magnets forming part of the control circuit described in detail hereinafter.

With the circuit as illustrated in Fig. 10 the film is fed forwardly to its pre-selected position until the energization of the cam release magnets or relays 190 and 191 effect a stopping of the film for the purpose of registering the frame which is desired. During this operation the circuits of the motor M is made from the main 110 through terminal 117 of the motor, terminal 116 of the motor, normally closed contacts 112 and 113 and back to the opposite end of the line 111. Upon the energization of the magnet 190, the armature 111a is retracted, thereby releasing the cam 122 for rotation as well as simultaneously opening contacts 112, 113 and closing contacts 113 and 114. With the circuit modified in this respect, the motor M is energized from the line 110 through the terminal 117, the armature winding, the terminal 116, conductor 123, normally closed contacts 128', 129', resistor 120, contacts 114, 113 and conductor 111 constituting the opposite side of the line. This modified circuit in effect serves to cut resistor 120 into the motor circuit in order to decrease the speed thereof and thereby the rate of travel of the film fed thereby for the purpose of facilitating the stopping of the drive. It is noted that the continuous movement of the film carries the desired frame beyond the registering station and it is necessary to return it to that station before arresting the film in order to obtain an indication or registration of the desired record.

The withdrawal of the stop 171 by the operation of magnet 190 permitted the cam 122 to travel in a clockwise direction by means of the coupling of the cam 122 to the shaft 200 through the intermediary of the slip-clutch 201. Abutment 122n acts upon the inclined face 170f of stop 170, which moves against the force of spring 170s without being impeded in its clockwise travel. This condition of movement at decreased speed is not affected until the dwell 122a arrives below the roller 125, whereupon contacts 126 and 127 close. Thereby the low voltage operating circuit for the magnet 132 is closed through the following connections; the positive side of the low voltage control circuit 150, conductor 131, magnet 132, conductor 133, contacts 126, 127, conductor 136, and the main 151 of the low voltage control circuit. Thereby the magnet 132 is energized and attracts the armature 132a which is latched by the catch 132b. The downward movement of the armature 132a about its pivot 132p effects an opening of contacts 128', 129', which serves to break the low speed operating circuit through the motor at this point.

Assuming that the inertia of the motor with the driving mechanism carries the shaft 200 forward in the same direction, the disk 122 continues its travel until the dwell therein 122a arrives below roller 130, whereupon contacts 140, 141 are closed and complete the following circuit through the magnet 142: main 150, conductor 143, magnet 142, conductor 144, contacts 141, 140, conductor 145 and main 151. The relay 142 attracts its armature 142a which is immediately latched by the pawl 42b, and the movement of the armature 142a around its pivot 142p closes the contacts 145, 144 which complete a circuit for operating the motor M in a reverse direction. This circuit may be traced from the main 110, conductor 146, resistor 140, terminals 148 and 147 of the motor, conductor 152, contacts 145 and 144, normally closed contacts 154 and 155, conductor 156 and the main 111. The completion of this circuit causes the motor M to reverse in direction at reduced speed by virtue of the resistor 149 included in the circuit.

The motor M may be designed as a split field motor having two oppositely wound field windings therein in which the junction of the two field windings is connected internally to one terminal of the armature and the opposite terminal of the armature leads outwardly to external terminals such as 115 and 147. The external field terminals may be represented by terminals 117 and 148. Thus, in the making of the circuits described above the motor is operative by either alternating current or direct current and its direction is determined by the particular terminals which are used, with its speed in both directions being controllable by the insertion of a suitable amount of resistance in circuit therewith.

In the operations described above, the motor reverses in direction when the roller 130 falls within the dwell 122a at which time the film has overrun beyond the desired record a distance corresponding to the movement of shaft 200 in a clockwise direction from the positions shown in Fig. 10 to that in which the roller 130 is in dwell 122a. This movement may correspond to 100 record frames of the film strip or any other suitable extent which may be adjusted by suitable gear ratio between gears 642 and 652, which drive the control mechanism described above. In the assumed case, pinion 642 bears a 1 to 25 ratio to the gear 652 which drives the shaft 200.

It is now the function of the cam control device to control the reverse movement of the film for an extent corresponding to the extent of overrunning of the film travel, and to positively stop the film at the conclusion of that movement in order to bring into alinement the desired record frame with the registering station 650. The cam 123 with its locking disk 123d associated with its stops 180 and 181 serves this purpose.

In view of the fact that stop 181 is in retracted position from the time that magnet 191 was energized upon the counting mechanism reaching the predetermined numerical sequence of the desired record frame, the disk 123 is free to turn in a counterclockwise direction and the beveled face 180f of stop 180 offers no impediment to the movement of the disk in this direction. Stop 170 is positioned on the outer periphery of the locking disk 122d and offers no impediment to the travel of the cam unit 122 and 122d in a clockwise direction. The movement of the dwell 122a and the consequent movement of the rollers 125 and 130 exert no effect upon the motor control circuits, particularly the circuit for rotating the motor in a reverse direction at low speed, on account of the latching pawls 132b and 142b cooperating with the armatures 132a and 142a of the holding circuit magnets 132 and 142.

The disk 123 continues its counterclockwise movement for an extent corresponding to the previous forward movement of disk 122 and when the dwell 123a therein arrives below roller 135 the rotation of the armature 137 about its pivot 137p executes two operations. In the first place the circuit for operating the motor from the high voltage main 110, 111 is broken at 154 and 155 to stop the film movement. In the second place a normally energized magnet 400 is deenergized by the interruption of its magnetizing circuit at contacts 158, 159, the circuit of which is bridged across the low voltage mains 150 and 151 through conductor 161, magnet 400, conductor 162, contacts 158 and 159, and conductor 160. The deenergization of this magnet makes possible the release of the armature by the exertion of the tension of a spring 401 which normally operates against the magnetizing force of the magnet. Thereby, a positive release of the armature is assured in order to render instantaneously effective a stopping mechanism for the film at the time that the desired record frame is in registry with the registering station 650. The armature 402 cooperates with the stopping assembly in a manner described below.

The stopping assembly may be mounted upon shaft 621 of the first feed roll 610 or upon any other feed roll in closer proximity to the registering station. This assembly is formed by a locking disk 407 having four stop abutments 407' formed upon the periphery thereof in view of the fact that the feed roll advances four record frames of the film strip for each revolution thereof. Thereby, one abutment 407' is allotted to each quarter revolution of the feed roll in order to make possible a stopping of the film strip at each record frame. A cam plate 406 is connected with the locking disk 407 (Figs. 5 and 7) which is designed to rotate with the locking disk. A reciprocating bar is mounted for vertical reciprocation in slots 412 provide in the machine frame 410 and has a roller 504 mounted thereon cooperating with the cam plate 406 to effect a successive raising of the bar against the action of the spring 411 in the course of rotation of the cam plate. In the transmission arrangement disclosed in the specific embodiment this bar is raised and lowered four times for each revolution of the shaft 621. A stop lug 408 extending within the field of travel of the locking disk 407 is attached to bar 404 and takes part in the movements thereof. A notch 403 is formed in the bar 404 and is designed to cooperate with the armature 402 of the magnet 400. In the normal operation of the machine the rotation of the shaft 621 causes, by means of the parts described above, a repeated up and down movement of the bar 404 and the stop lug 408 thereon in such timed relationship that a passing clearance between the lug 408 and abutments 407' is had. However, upon the release of the armature 402 by the attainment of the condition described above, the former engages the notch 403 in the bar 404 and does not permit its downward movement, whereupon the lug 408 remains in the path of travel of the coming abutment 407' causing the arresting of the feed roll 610 and the film travel.

Figure 4:
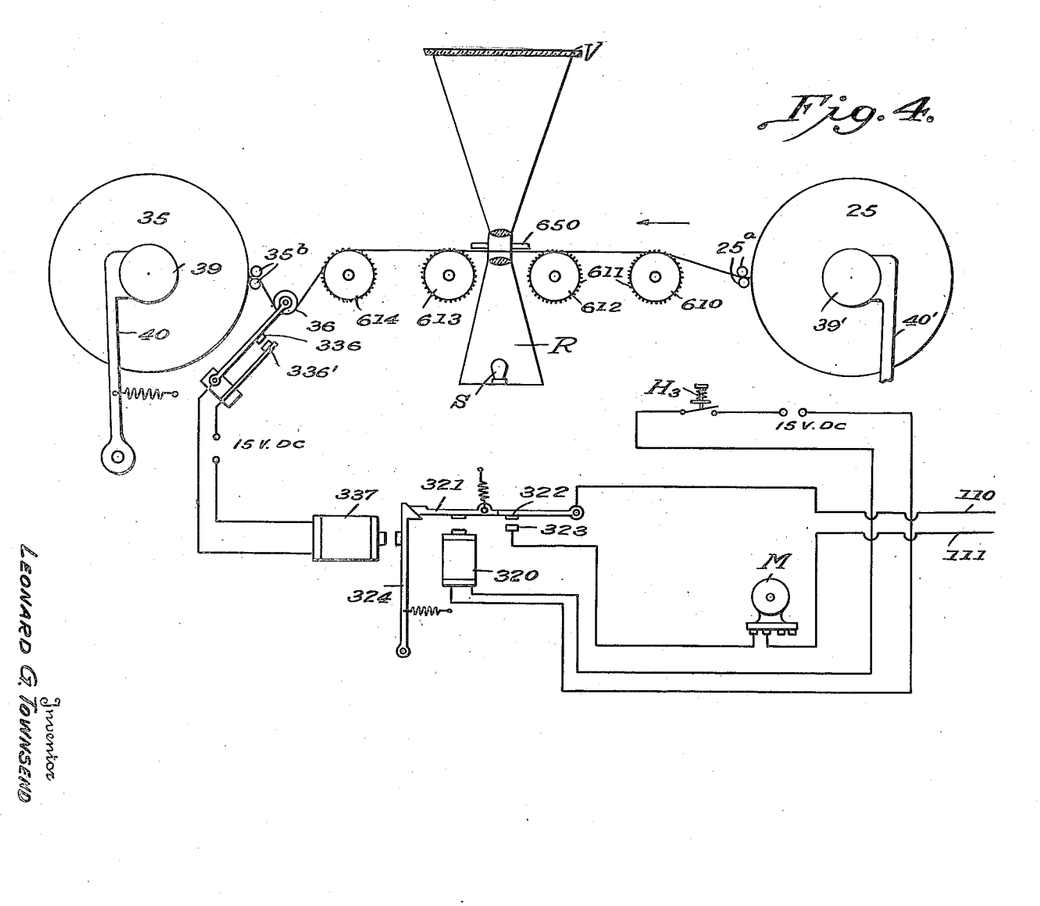
Figure 4 is a schematic diagram in front elevation showing the general relationship of the parts in the course of travel of the film from the magazine to the take-up reel, including circuit diagram for the control of the rewinding of the film at the completion of the desired operations therewith.

Upon the stopping of the film, the projection system shown schematically in Fig. 4 is energized either manually or automatically to obtain a visual indication on the viewing plate V of the document record or a permanent record in the form of a contact print or enlarged print in any manner well known in the art. Thereupon, a depression of the release key H4 (Fig. 3) energizes the magnet 29 (Fig. 2) to attract the common bar 19' connected with the latching bars 19 for the keys K to release whichever keys are in depressed position. The release of the keys may also be accomplished automatically either by embodying a control therefor in the projection mechanism or in the motor control circuit after the desired setting has fully accomplished its purpose. Of course, the same effect obtained by the release key H4 may be realized by the use of the key H4' at the top of the machine when the latter is operating in a completely automatic manner.

A new setting of the setting mechanism is again made by the following punched card in the automatic operation of the machine or by a manual setting on H to recondition anew the circuit closing devices shown in Figs. 2, 8, 8a, and 9. Thereafter when the start button is depressed it simultaneously effects a resetting of the several holding circuits made by the analyzer magnets and holding magnets 132 and 142, by the energization of magnets 258, 268, 278, 288, 298, 232 and 242, and the energization of the film feed motor M, and these circuits are in condition to be controlled again in a manner described above upon the counting device reaching the count corresponding to the selected numerical value of the desired record.

The above operation is repeated for the required number of records, to which reference is desired, on a single film.

After all the desired records in one film are obtained, the film is rewound from the take-up reel into the magazine by suitable adjustments of the driving devices on shafts 25' and 35' and by the depression of the rewind key H3, which as shown generally in Fig. 10 completes a circuit to the terminals 147 and 148 of the motor without interposition of a resistance therein, in order to operate the motor in a reverse direction at high speed. In a preferred embodiment of this circuit, as shown in detail in Fig. 4, a relay 320 is inserted therein which attracts the armature 321 and which completes the circuit across the contacts 322 and 323. The refinement provided by this relay makes possible an automatic breaking of the rewind circuit upon the conclusion of the rewinding operation. This is accomplished by an idling roller 36 supported by a loop in the film as it is drawn from the guide rolls 35b of the take-up reel 35 provided with a contact 336 which is maintained separated from a cooperating contact 336' as long as the film is traveling to the magazine. Upon the conclusion of the rewinding operation the roll 36 drops by gravity to complete the circuit from a low voltage source of direct current to a magnet 337 across the contacts 336 and 336', thereby attracting a latching lever 324 for the armature 321 which is then permitted to have the force of a spring exert its action thereupon to break the motor circuit at contacts 322 and 323.

In order to condition the machine for the purpose of alining accurately the desired frame with the registering station it is advisable that the machine be operated for an assumed circuit corresponding to five zeros. This is done manually by depressing the five zero keys on the keyboard. Thus, when the old reel or film has been removed and the zero keys depressed, the machine will run past the zeros for a predetermined extent such as 100 frames and back again to the zero position where it stops with the several analyzer magnets closed. The new reel of film is now inserted and the frame immediately in advance of the first frame is alined with the registering station. The proper selecting keys are now depressed corresponding to the selected document record and if the serial number does not require the complete five digits the zero keys to the left of the highest denomination are also depressed. Next the starter or reset key H1 is depressed whereby the circuits completed by the analyzer magnets and the holding magnets 132 and 142 are broken. Also the energization of the motor M feeds the film forward at full speed until the selected numerical sequence is reached whereupon the circuit controlled by the analyzer magnets is completed for the purpose of controlling the motor circuit shown in Fig. 10. Upon the final stopping of the film an exposure is made of the desired document record, the setting keys are released if they have not been released previously, and a new setting is made, and the reset or start key is operated once more. In Fig. 10, the switch 225 is shown in the reset circuit adapted to be controlled by the key H1.

The machine is adjusted in like manner for automatic operation, in which case a card having openings in the zero positions may be run through the machine in lieu of a manual zero setting.

In the start of operations with the punched cards after the film has been alined in the manner described above, one of the keys C is depressed and a punched card is fed into sensing position. After the sensing pins have penetrated the punched holes in the card and set the corresponding circuits in the keyboard, the last action of the punched card drive motor is to actuate a cam that closes the reset circuit for the analyzer magnets and the holding magnets 132 and 142. This control is illustrated schematically in Fig. 10 by the cam 227 operating to close the reset circuit across contacts 226, 228. Then the punched card drive control circuit is automatically broken, or disengaged through a clutch. The film feed drive motor, which may be rendered operative simultaneously with the resetting operation rotates at high speed until the section of the film corresponding to the selected setting is reached. The film then moves in the manner described above in detail, that is, it travels forward at reduced speed and reverses for a similar extent until the desired document image is in alinement with the registering station whereupon an exposure thereof is made either by manual control or automatically.

Following an exposure of one of the record frames, the start key of the punched card drive motor may be again depressed and the next count serves to set up a new serial number into the machine corresponding to the position of the next desired document record on the film strip.

Should a projection photographic print on sensitized paper be desired instead of a projected image on the viewing plate, the punched card start key circuit may be actuated automatically by a time-delayed action, attained either by cam, bellows or electrical circuit, which may operate from an auxiliary motor which serves to time also the interval necessary in making the desired projection photographic print.

Should a positive film contact print be desired, requring a relatively short period of time, the punched card start key circuit may be actuated automatically by a like cam action introducing a different time interval according to the time necessary for making the desired positive film contact print.

The method and apparatus disclosed herein lends itself particularly well to communication systems of the wired or wireless type commonly known in the art, particularly facsimile or picture transmissions. Thus, instead of electrical circuits controlled manually or by punched cards, for conditioning the operation of the machine for selection of a desired record, electrical impulses may be received from a remote point, which complete the desired circuits. Furthermore, the exposed document record may be scanned by facsimile apparatus for the purpose of re-transmitting the complete record to the transmitting station or any other point in response to the received impulses for controlling its selection.

It is to be understood that many embodiments of the invention including some in improved form, will be apparent, and in the course of time more will be devised by those skilled in the art. It is not desired that this invention be limited to the details described, for its scope includes all such forms or improvements as come within the spirit of the following claims construed as broadly as the prior art will permit.

The invention described herein may be manufactured and used by or for the Government of the United States of America for governmental purposes without the payment of any royalty thereon or therefor.

Having thus described my invention, what I claim is:

1. The method of deriving information from a record bearer containing a series of separate records which comprises advancing the record bearer at a rate which is too rapid to permit a selection of a desired individual record, automatically decreasing the rate of advance of said record bearer upon the arrival of a desired record at a preselected point, stopping the advance of said record bearer at a predetermined time after the rate of advance thereof has been decreased, advancing the record bearer in a reversed direction at a decreased rate of speed, and automatically stopping the travel of the record bearer at a preselected point of its lineal travel corresponding to a predetermined position of the individual record upon the record bearer.

2. The method of collecting records common to a predetermined classification from a record bearer containing records appurtenant to a plurality of classifications which comprises pre-selecting the portion of the record-bearer containing a record falling within the predetermined classification, advancing the record bearer past a registering station, and automatically stopping the record bearer at the registering station in response to the travel of the record bearer for an extent corresponding to the pre-selecting step.

3. The method of compiling records common to a predetermined classification from a continuous film bearing records appurtenant to a plurality of classifications which comprises pre-selecting the section of the film containing the desired record in accordance with the numerical sequence of the desired record relative to the other records in the film, advancing the film past a registering station, and stopping the film at the registering station for the visual indication or permanent recording of the desired record in response to the predetermined extent of lineal travel of the film governed by the setting of the numerical sequence.

4. The method of compiling records common to a predetermined classification from a continuous film bearing records appurtenant to a plurality of classifications which comprises pre-selecting automatically the section of the film containing the desired record in accordance with the position of the desired record on the film, feeding the film at a rapid rate past a registering station, stopping the film at the registering station in response to the predetermined extent of lineal travel of the film according to the pre-selected position of the desired record, and visually indicating or permanently recording on an enlarged scale the desired record.

5. The method of compiling records common to a predetermined classification from a continuous film bearing records appurtenant to a plurality of classifications which comprises pre-selecting the section of the film containing the desired record in accordance with the numerical sequence of the desired record relative to the other records in the film, advancing the film past a registering station, decelerating the travel of the film upon the arrival of the desired record at the registering station, stopping the film when the desired record has traveled a predetermined distance beyond the registering station, feeding the film in a reverse direction and at a reduced speed for the extent represented by the original travel of the film beyond the registering station, and stopping the film at the registering station for the visual indication or permanent recording of the desired record.

6. The method of compiling records common to a predetermined classification from a continuous film bearing records appurtenant to a plurality of classifications which comprises pre-selecting the section of the film containing the desired record in accordance with the numerical sequence of the desired record relative to the other records in the film, advancing the film past a registering station at a rapid rate, automatically decelerating the travel of the film in response to the coincidence of the pre-selected numerical sequence of the desired record and the arrival of the record at the registering station, automatically stopping the film following the travel thereof for a predetermined extent at reduced speed, feeding the film in a reverse direction and at reduced speed for the extent corresponding to the forward decelerated travel of the film beyond the registering station, and automatically stopping the film at the registering station for the visual indication or permanent recording of the desired record.

7. The method of compiling records common to a predetermined classification from a continuous film bearing records appurtenant to a plurality of classifications which comprises pre-selecting the section of the film containing the desired record in accordance with the numerical sequence of the desired record relative to the other records in the film, advancing the film past a registering station at a rapid rate, automatically decelerating the travel of the film in respose to a predetermined extent of lineal travel thereof bearing a fixed relationship to the pre-selected numerical sequence of the desired record, and stopping the film at the registering station for the visual indication or permanent recording of the desired record.

8. The method of compiling records common to a predetermined classification from a continuous film bearing records appurtenant to a plurality of classifications which comprises pre-selecting the section of the film containing the desired record in accordance with the numerical sequence of the desired record relative to the other records in the film, advancing the film past a registering station at a rapid rate, automatically decelerating the travel of the film in response to a predetermined extent of lineal travel thereof bearing a fixed relationship to the pre-selected numerical sequence of the desired record, preliminarily stopping the film, feeding the film at reduced speed to the point of registry of the desired record with the registering station, and finally stopping the film at the registering station for the visual indication or permanent recording of the desired record.

9. The method of compiling records common to a predetermined classification from a continuous film bearing records appurtenant to a plurality of classifications which comprises pre-selecting the section of the film containing the desired record in accordance with the numerical sequence of the desired record relative to the other records in the film, advancing the film past a registering station at a rapid rate, automatically decelerating the travel of the film in response to a predetermined extent of lineal travel thereof bearing a fixed relationship to the pre-selected numerical sequence of the desired record, preliminarily stopping the film with the desired record beyond the registering station, feeding the film at a reduced speed in a reverse direction to bring the desired record to the registering station, and finally stopping the film at the registering station for the visual indication or permanent recording of the desired record.

10. The method of collecting a summary of records common to a predetermined classification from a continuous record bearer containing records appurtenant to a plurality of classifications which comprises photographing the original documentary records upon a record bearing strip, preparing punched cards from successive exposures of the document records and identifying the respective punched cards in accordance with the numerical sequence of the respective records in relation to the other records on the record bearing strip, pre-selecting the punched cards and correspondingly the portions of the film containing the desired records in accordance with the numerical sequences of the desired records relative to the several records on the record bearing strip, feeding the record bearer past a registering station, and successively stopping the record bearer at the registering station for predetermined periods in response to predetermined extents of lineal travel of the film corresponding to the pre-selected numerical sequences for obtaining visual indications or permanent recordings of the desired records.

11. In a machine operating with records, an automatically operating mechanical sensing mechanism controlled by apertures in a record card, a manually operated setting mechanism comprising a plurality of setting elements, and a common electrical circuit adapted to be controlled by said mechanisms, said manually operated setting elements adapted to be interposed between said automatically operating sensing mechanism and said electrical circuit in the course of operation of said first mechanism.

12. In a machine operating with records, an automatically operating mechanical sensing mechanism controlled by apertures in a record card, a manually operated setting mechanism comprising a plurality of keys, an electrical circuit adapted to be conditioned by the operation of said keys, said manually operated setting mechanism being movable into and out from the range of operation of said automatically operating sensing mechanism whereby the keys are adapted to be actuated selectively by said last-mentioned mechanism and manually in the respective positions of said manually operated setting mechanism to correspondingly control said electrical circuit.

13. In a machine of the class described, means for feeding a record bearer containing a series of separate records past a registering station, a drive mechanism for said feeding means, means for pre-selecting an individual record for alinement with said registering station, and means responsive to the lineal travel of the record bearer corresponding to the pre-selection of the record for controlling said drive mechanism to decrease rate of speed of travel of said record bearer, stop it, and move it in a reverse direction at a slow rate of speed and stop it with the desired record at the registering station to effect a visual indication or permanent recording thereof.

14. In a machine of the class described, a magazine for a continuous film bearing a series of records, a take-up reel for the film, a registering station between said magazine and reel, means for feeding the film from said magazine to said take-up reel past said registering station, a drive mechanism for said feeding means including an electric motor, a counting device actuated by said feeding means, setting means for selecting an individual record on said continuous film comprising an electrical circuit adapted to be conditioned for operation by said counting device in response to said counting device reaching a predetermined relation with respect to said setting means, and control means operated by said electrical circuit for modifying the operation of said electric motor and for stopping said feeding means to bring the desired record into the field of said registering station to effect a visual indication or permanent recording thereof.

15. In a machine of the class described, a magazine for a continuous film bearing a series of records, a take-up reel for the film, a registering station between said magazine and reel, means for feeding the film from said magazine to said take-up reel past said registering station, a drive mechanism for said feeding means including an electric motor, a counting device actuated by said feeding means, automatically operating sensing means controlled by openings in a record card for selecting an individual record on said continuous film corresponding to its numerical sequence thereupon, an electrical circuit adapted to be adjusted by said sensing means, said circuit adapted to be completed in response to the coincidence of the count on said counting device with the numerical sequence operated by said sensing means, and means controlled by the completion of said last-mentioned circuit to stop the desired record at the registering station to effect a visual indication or permanent recording thereof.

16. In a machine of the class described, a magazine for a continuous film bearing a series of records, a take-up reel for the film, a registering station between said magazine and reel, means for feeding the film from said magazine to said take-up reel past said registering station, a drive mechanism for said feeding means including an electric motor, a counting device actuated by said feeding means, setting means for selecting a record on said continuous film corresponding to its numerical sequence in relation to the other records on the film, an electrical circuit adapted to be adjusted by said setting means, said circuit adapted to exercise a controlling function in response to the coincidence of the count on said counting device with the numerical sequence determined by said setting means, and means responsive to the controlling function of said last-mentioned circuit to stop the desired record at the registering station to effect a visual indication or permanent recording thereof.

17. The combination set forth in claim 16 wherein said last-mentioned means comprises a control cam device frictionally coupled to said drive mechanism, a control circuit for said electric motor operated by said cam device, and a stopping assembly connected with said film feeding means rendered operative by said control cam device to stop the film with the pre-selected record at said registering station.

18. The combination set forth in claim 16 wherein said last-mentioned means comprises a control cam device frictionally coupled to said drive mechanism associated with said cam device, a control circuit for said electric motor comprising switching means for decreasing the speed of the motor upon the arrival of the desired record at the registering station, switching means for de-energizing the motor after a predetermined extent of over-running of the film drive in a forward direction at reduced speed, switching means for reversing the motor and the direction of the film drive for a like extent as the forward over-running drive to bring the desired record back at reduced speed into alinement with the registering station, and switching means for de-energizing the motor upon the arrival of the desired record at the registering station from the reverse direction of film movement, and a stopping assembly connected with said film feeding means comprising a mechanical stop element adapted to be interposed in the path of said film feeding means simultaneously with the operation of said last-mentioned switching means.

19. An assembly for stopping the movement of a film upon a rotatable feed roller provided with sprockets for engaging the apertures in the film comprising a locking disk connected with said feed roller and provided with at least one abutment upon the periphery thereof, a cam plate adjacent said disk, and connected therewith, a slidable bar mounted for movement adjacent said locking disk and cam plate, a roller on said bar cooperating with said cam plate whereby the rotary movement of said cam plate imparts a translating movement to said bar, a stop member on said bar extending within the field of movement of said abutment and normally adapted to be moved therefrom by the timed translating movement of said bar, and means for latching said bar in fixed position in response to a predetermined condition whereby said stop member remains interposed in the path of said abutment to effect a stopping of the locking disk and the feed roller connected therewith.

20. The combination set forth in claim 16 wherein said last-mentioned means comprises a control cam device frictionally coupled to said drive mechanism associated with said cam device, a control circuit for said electric motor comprising switching means for decreasing the speed of the motor upon the arrival of the desired record at the registering station, switching means for de-energizing the motor after a predetermined extent of over-running of the film drive in a forward direction at reduced speed, switching means for reversing the motor and the direction of the film drive for a like extent as the forward over-running drive to bring the desired record back at reduced speed into alinement with the registering station, and switching means for de-energizing the motor upon the arrival of the desired record at the registering station from the reverse direction of film movement; a stopping assembly connected with said film feeding means comprising a mechanical stop element adapted to be interposed in the path of said film feeding means simultaneously with the operation of said last-mentioned switching means, holding devices for maintaining said electrical circuit conditioned by said counting device and said motor control circuits in their adjusted positions, and means for resetting said holding devices prior to a repeated operation of the machine.

21. The method of making and thereafter selecting records, comprising photographing original records on a film strip, preparing punched cards corresponding to the respective photographic impressions on the strip, running the strip past a registering station, and stopping the strip with a predetermined photographic image in registration with said station in accordance with a selected punched card.

22. A device for selecting and positioning at a registering station any desired record from a strip containing a plurality of records under control of a punched card punched to correspond to at least one characteristic of said desired record, comprising a punched card sensing mechanism, means responsive to the sensing of a punched card by said sensing mechanism for serially moving the individual records of said strip at a high rate of speed past said registering station, means responsive to the arrival of the record corresponding to the card selected at said registering station for decreasing the rate of speed of said strip, means for stopping the movement of said strip at a predetermined time after the forward-motion thereof has been decreased, and means responsive to the stopping of said strip for moving it in a reverse direction at a slow speed a distance corresponding exactly to the distance traveled thereby in a forward direction at reduced speed to position the preselected record at said registering station.

23. The method of positioning a selected portion of an elongated body at a registering station which comprises moving successive portions of said body past said registering station at a rate so high as to render impracticable the abrupt stopping of the body, reducing the speed of travel of said body coincident with the passage of said selected portion thereof past said registering station, stopping said body and automatically reversely moving said body at a reduced speed a distance exactly equal to the distance traveled thereby subsequent to the passage of said selected portion thereof past said registering station.

24. A device for positioning a preselected portion of a body at a registering station, comprising driving means for moving said body at a high rate of speed to bring successive portions thereof past said registering station, means responsive to the arrival of the preselected portion of said body at said registering station for decreasing the rate of speed of travel of said body, means for stopping the movement of said body responsive to the travel of the preselected portion thereof a predetermined distance past said registering station, and a means responsive to the stopping of the travel of said body for moving said body in a reverse direction at a slow rate of speed a distance corresponding exactly to the distance traveled thereby subsequent to the arrival of the preselected portion at said registering station.

25. A device in accordance with claim 24 in which the three means last mentioned include a pair of cams, means for urging said cams to rotate at a speed and in a direction proportional and corresponding to the speed and direction of motion, respectively, of said driving means, a first pair of spring-actuated locking means, one individual to each of said cams, for normally restraining rotational movement of said cams in one direction, a second pair of spring-actuated locking means, one individual to each of said cams, for normally restraining rotational movement of said cams in another direction, counting means responsive to the initial arrival of the preselected portion of said body at said registering station for unlocking one spring-actuated locking means from each of said cams to permit one of said cams to be free to move in a clock-wise direction and the other one to be free to move in a counter-clock-wise direction, whereby a first one of said cams begins rotational movement with said driving means, means responsive to the actuation of the unlocking means for reducing the speed of said driving means, means responsive to the rotation of said first cam through a predetermined angle for withdrawing the application of power to said driving means, means responsive to the rotation of said first cam through a further predetermined angle for operating said driving means to drive in a reverse direction at a low speed, whereby said second cam begins rotational movement with said driving means, and means responsive to rotation of said second cam through a predetermined angle for withdrawing the application of power to said driving means and stopping the movement of said body.

26. The method of making and thereafter selecting records, comprising photographing records on a film strip, preparing punched cards for the individual records in accordance with the numerical sequence of the records on the film strip, running the strip past a registering station, and bringing a predetermined record of the strip into stationary registration with said station, in accordance with a selected punched card.

27. The method of making and thereafter selecting records, comprising photographing records on a film strip, projecting the successive records of the strip on a viewing plate, preparing therefrom punched cards for the individual records, and numbering such cards in accordance with the numerical sequence of the records on the film strip, running the strip past a registering station, and bringing a predetermined record into stationary registration with said station in accordance with a selected punched card.

28. The method of making and thereafter selecting records, comprising photographing original records on a film strip, preparing punched cards corresponding to the respective photographic impressions on the strip, running the strip past a registering station, bringing a predetermined photographic record into stationary registration with said station in accordance with a selected punched card, and projecting a light beam through the record at said station.

29. The method of making and thereafter selecting records for individual visual observation, comprising photographing records on a film strip, preparing punched cards corresponding to the respective photographic impressions on the strip, running the strip past a registering station, bringing a predetermined photographic impression into stationary registration with said station in accordance with a selected punched card, and projecting the image of the photographic impression at said station onto a viewing plate.

30. In a machine of the class described, the combination of a magazine and take-up reel for a film strip, a registering station between said magazine and reel, electrically operated means for feeding the film from said magazine to said take-up reel past said station, and for arresting the feeding means with a photographic impression on said film in registration with said station, and electrically operated control means for said feeding means adapted to be in turn controlled by punched cards.

31. In a machine of the class described, the combination of a magazine and a take-up reel for a film strip, a registering station between said magazine and reel, a viewing plate covering said registering station, electrically operated means for feeding the film from said magazine to said take-up reel past said station and for arresting the feeding means with a photographic impression on said film in registration with said station, electrically operated control means for said feeding means adapted to be in turn controlled by punched cards, and means for projecting a light beam through an image in registration with said station on to said viewing plate.

32. In a device for selecting and positioning at a registering station a desired portion of a strip containing a plurality of portions of similar area, a variable speed motor for driving said strip, a plurality of selector contacts, selector switches individual to each of said contacts, a plurality of rotatably mounted contact means responsive to movement of said motor and said strip so that one of said rotatably mounted contact means rotates at a speed which is a measure of the speed of said strip, and the others rotate at $\frac{1}{10}$, $\frac{1}{100}$, $\frac{1}{1000}$, etc. respectively of said speed, means responsive to the completion of an electric circuit between the rotatably mounted contact means traveling at lowest speed and a selector contact associated therewith that has been selected by the closure of its individual selector switch for energizing a relay individual to said rotatably mounted contact means, means responsive to the completion of electric circuits between the other rotatably mounted contact means and selected selector contacts associated therewith serially for energizing a series of relays each of which is individual to a rotatably mounted contact means and means responsive to the energization of all of said relays for completing a control circuit and initiating the stopping of said motor.

33. In a device for selecting and positioning at a registering station a desired record from a strip containing a plurality of records, a variable speed motor for driving said record strip, a plurality of selector contacts, a plurality of rotatably mounted contacts each adapted to be positioned in electrical contact with respective ones of said selector contacts, means for initially driving said motor at a high rate of speed and variably operable means for predetermining the length of the strip thereby moved by said motor before the speed thereof is reduced said last mentioned means including rotatably mounted and selector contacts.

34. In a device for selecting and positioning at a registering station a desired portion of a strip containing a plurality of records, a motor for driving said strip, a plurality of decimally rotatable counting devices for counting the number of records passing said registering station, a control circuit, means responsive to the arrival of the most slowly rotating counting device at a preselected position for closing a first pair of contacts in said control circuit, means responsive to the subsequent arrival of the second most slowly rotating counting device at a preselected position for closing a second pair of contacts in said control circuit, etc., means responsive to the subsequent arrival of the most rapidly rotating counting device at a preselected position for completing said control circuit and means responsive to the completion of said control circuit for initiating the stopping of said motor.

35. A device as set forth in claim 34 in which said last named means includes means for reducing the speed of said motor for a predetermined length of time prior to stoppage thereof.

LEONARD G. TOWNSEND.